(12) United States Patent
Arora

(10) Patent No.: US 11,893,034 B2
(45) Date of Patent: *Feb. 6, 2024

(54) DISTANCE BASED SEARCH RANKING DEMOTION

(71) Applicant: Google LLC, Mountain View, CA (US)

(72) Inventor: Neha Arora, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,819

(22) Filed: Sep. 12, 2022

(65) Prior Publication Data

US 2023/0072600 A1 Mar. 9, 2023

Related U.S. Application Data

(63) Continuation of application No. 16/026,355, filed on Jul. 3, 2018, now Pat. No. 11,442,946, which is a
(Continued)

(51) Int. Cl.
*G06F 16/2457* (2019.01)
*G06F 16/29* (2019.01)
(Continued)

(52) U.S. Cl.
CPC ...... *G06F 16/24578* (2019.01); *G06F 16/248* (2019.01); *G06F 16/29* (2019.01);
(Continued)

(58) Field of Classification Search
CPC .......... G06F 16/24578; G06F 16/9537; G06F 16/248; G06F 16/29; G06F 16/9535; H04L 2101/69
See application file for complete search history.

(56) References Cited

U.S. PATENT DOCUMENTS 6,317,741 B1 11/2001 Burrows
7,277,928 B2 10/2007 Lennon
(Continued)

FOREIGN PATENT DOCUMENTS

CN 101223526 7/2008
CN 101636737 A 1/2010
(Continued)

OTHER PUBLICATIONS

Regard "Mobile Devices Catalyst for Better Records Management" Information Management, Overland Park, vol. 46, Issue 5, Oct. 2012.*

(Continued)

*Primary Examiner* — Todd L Barker
(74) *Attorney, Agent, or Firm* — Dority & Manning, P.A.

(57) ABSTRACT

Methods, systems, and apparatus, including computer programs encoded on a computer storage medium, for processing local search results. In one aspect, a method determines a first local document in a set of local documents for search results is eligible for a demotion operation. The determination is based at least in part on a proximity measure based on the location of the user device and a location specified for the first local document. In response to the determination, for each other local documents in the set of local documents, a proximity measure location of the user device and the location specified for the other local document is determined. The first local document is demoted in its ranking when at least one of the proximity measures indicates a respective other local document has a specified location that is within a threshold distance of the location of the user device.

18 Claims, 3 Drawing Sheets

Related U.S. Application Data continuation of application No. 14/990,072, filed on Jan. 7, 2016, now Pat. No. 10,031,951, which is a continuation of application No. 14/057,692, filed on Oct. 18, 2013, now Pat. No. 9,262,541.

(51) Int. Cl.
  *G06F 16/248* (2019.01)
  *G06F 16/9537* (2019.01)
  *G06F 16/9535* (2019.01)
  *H04L 101/69* (2022.01)

(52) U.S. Cl.
  CPC ...... *G06F 16/9537* (2019.01); *G06F 16/9535* (2019.01); *H04L 2101/69* (2022.05)

(56) References Cited

U.S. PATENT DOCUMENTS

| | | |
|---|---|---|
| 7,822,742 B2 | 10/2010 | Majumder et al. |
| 7,827,170 B1 | 11/2010 | Horling et al. |
| 7,870,127 B2 | 1/2011 | Gupta et al. |
| 8,046,371 B2 | 10/2011 | O Clair et al. |
| 8,051,076 B1 | 11/2011 | Garg et al. |
| 8,065,199 B2 | 11/2011 | Dumon et al. |
| 8,195,653 B2 | 6/2012 | Dandekar et al. |
| 8,332,396 B1 | 12/2012 | Srinivasaiah et al. |
| 8,396,888 B2 | 3/2013 | Cheng et al. |
| 8,417,721 B1 | 4/2013 | Upstill et al. |
| 8,478,751 B1 | 7/2013 | Garg et al. |
| 8,484,188 B1 | 7/2013 | Upstill et al. |
| 8,527,538 B1 | 9/2013 | Upstill et al. |
| 8,645,362 B1 | 2/2014 | Jain et al. |
| 8,819,004 B1 | 8/2014 | Petcherski et al. |
| 8,832,088 B1 | 9/2014 | Chen et al. |
| 8,949,277 B1 | 2/2015 | Lieuwen et al. |
| 9,098,511 B1 | 8/2015 | Lawry |
| 9,111,011 B2 | 8/2015 | Kogan |
| 9,152,701 B2 | 10/2015 | Linsley |
| 9,189,526 B1 | 11/2015 | Chen |
| 10,687,113 B2 | 6/2020 | Kegel |
| 2003/0065660 A1 | 4/2003 | Lau |
| 2004/0024752 A1 | 2/2004 | Manber et al. |
| 2005/0065916 A1 | 3/2005 | Ge et al. |
| 2005/0080786 A1 | 4/2005 | Fish |
| 2005/0154718 A1 | 7/2005 | Payne et al. |
| 2005/0262062 A1 | 11/2005 | Xia |
| 2006/0123014 A1 | 6/2006 | Ng |
| 2006/0218114 A1 | 9/2006 | Weare |
| 2006/0218146 A1 | 9/2006 | Bitan |
| 2007/0043723 A1 | 2/2007 | Bitan |
| 2008/0141307 A1 | 6/2008 | Whitehead |
| 2008/0154888 A1 | 6/2008 | Buron |
| 2008/0270379 A1 | 10/2008 | Ramakrishna |
| 2009/0132516 A1 | 5/2009 | Patel et al. |
| 2009/0171943 A1 | 7/2009 | Majmuder et al. |
| 2009/0234815 A1 | 9/2009 | Boerries |
| 2010/0115621 A1 | 5/2010 | Staniford |
| 2010/0174703 A1 | 7/2010 | Dandekar et al. |
| 2010/0262495 A1 | 10/2010 | Dumon et al. |
| 2010/0287174 A1 | 11/2010 | Yang et al. |
| 2011/0125779 A1 | 5/2011 | Fiero |
| 2011/0246937 A1 | 10/2011 | Roberts |
| 2011/0252031 A1 | 10/2011 | Blumenthal |
| 2011/0264654 A1 | 10/2011 | Wolosin et al. |
| 2012/0054302 A1 | 3/2012 | Priyadarshan |
| 2012/0143859 A1 | 6/2012 | Lymperopoulos et al. |
| 2012/0166432 A1 | 6/2012 | Tseng |
| 2012/0323938 A1 | 12/2012 | Skeen |
| 2013/0159383 A1 | 6/2013 | Tuliani |
| 2013/0246381 A1 | 9/2013 | Garg et al. |
| 2014/0133293 A1 | 5/2014 | Ismail |
| 2014/0280090 A1 | 9/2014 | Grappo |
| 2014/0282656 A1 | 9/2014 | Belyaev |
| 2014/0304258 A1 | 10/2014 | Vyas et al. |
| 2014/0365515 A1 | 12/2014 | Garrett et al. |
| 2015/0060973 A1 | 3/2015 | Tsai et al. |
| 2015/0066902 A1 | 3/2015 | Kim |
| 2015/0169605 A1 | 6/2015 | Kogan et al. |
| 2015/0169739 A1 | 6/2015 | Linsley |

FOREIGN PATENT DOCUMENTS

| | | |
|---|---|---|
| CN | 101636935 | 1/2010 |
| CN | 103562916 A | 2/2014 |
| WO | WO 2008073502 | 6/2008 |
| WO | WO 2008073508 | 6/2008 |

OTHER PUBLICATIONS

Ju et al., "RFID Dat Collection and Integration Based on Mobile Agent", IEEE Conference on Cybernetics and Intelligent Systems, Jun. 7, 2006.*

Bouidghaghen et al., "Personalizing Mobile Web Search for Location Sensitive Queiries", IEEE 12th International Conference on Mobile Data Management, Jun. 11, 2011, IEEE Publishing.*

Tung et al., "Location-assisted energy-efficient content search for moible peer to peer networks", IEEE international Conference on Pervasive Computing and Communications Workshops (PERCOM Workshops), Mar. 21, 2011, IEEE Publishing.*

Alistair, "Re-placing location: geographic perspectives in location based services," Zurich Open Repostiory and Archive, 2007.

Anderson, "Putting Search in Context: Using Dynamically Weighted Information Fusion to Improve Search Results," 2011 Eigth International Conference on Information Technology: New Generation, Apr. 2011.

Arif, "A Holistic Approach in Developing an Ensemble Mobile Peer-to-Peer Computing," 2013 Fifth International Conference on Computational Intelligence, Communication Systems and Networks, Jun. 2013.

Extended European Search Report in European Appln. No. 19196203, dated Dec. 5, 2019, 8 pages.

Han, "Research of nnobiile applications-oriented peer-to-peer context-aware mechanism," 2010 International Conference on Computer Application and System Modeling (ICCASM 2010), Oct. 2010.

International Search Report and Written Opinion in International Application No. PCT/US2014/060454, dated Jan. 7, 2015, 8 pages.

Na et al., "Design of location-based directory facilitator in context-aware environment," 2008 10th International Conference on Advanced Communication Technology, Feb. 2008, 3:2107-2110.

Na, "Design of Location-based Directory Facilitator in Context-Aware Environment", 10th International Conference on Advanced Communication Technology, Feb. 2008.

Office Action in Chinese Application No. 201480057219.3, dated Mar. 19, 2019, 12 pages (with English translation).

Office Action in European Application No. 19196203.4, dated Nov. 2, 2020, 8 pages.

Office Action in European Appln. 14790939.4-1222, dated Apr. 11, 2019, 4 pages.

Office Action issued in European Application No. 14790939.4, dated Jul. 4, 2018, 7 pages.

Summons to Attend Oral Proceedings issued in European Application No. 14790939.4, dated Dec. 10, 2018, 9 pages.

Chinese Search Report Corresponding to Application No. 2019110360947 dated Mar. 20, 2023.

* cited by examiner

US 11,893,034 B2

DISTANCE BASED SEARCH RANKING DEMOTION

CROSS-REFERENCE TO RELATED APPLICATIONS

This application is a continuation application of, and claims priority to, U.S. patent application Ser. No. 16/026,355, filed on Jul. 3, 2018, which is a continuation of U.S. patent application Ser. No. 14/990,072, filed on Jan. 7, 2016, which is a continuation of U.S. patent application Ser. No. 14/057,692, filed on Oct. 18, 2013. The disclosures of the foregoing applications are incorporated herein by reference in their entireties for all purposes.

BACKGROUND

This specification relates to processing local search results.

The Internet provides access to a wide variety of resources such as video or audio files, web pages for particular subjects, book articles, or news articles. A search system can identify resources in response to a search query that includes one or more search phrases (i.e., one or more words). The search system ranks the resources based on their relevance to the search query and on measures of quality of the resources and provides search results that link to the identified resources. The search results are typically ordered for viewing according to the rank.

Some search systems can obtain or infer a location of a user device from which a search query was received and include local search results that are responsive to the search query. A local search result is a search result that references a local document. A local document, in turn, is a document that has been classified as having local significance to particular locations of user devices. Accordingly, a local document may receive a search score "boost" for a query if the location associated with the local document is near the location of the user device. For example, in response to a search query for "coffee shop," the search system may provide local search results that reference web pages for coffee shops near the location of the user device. Many users in various geographic regions will likely be satisfied with receiving local results for coffee shops in response to the search query "coffee shop" because it is likely that a user submitting the query "coffee shop" is interested in search results for coffee shops that are local to the user's location.

Some local results, however, may have very high scores independent of the local scoring boost. This score, which is referred to as a "location independent score," may be high due to the document being of interest to people outside of a region that includes the location of the local result. For example, a restaurant may have a very unique name, and may also be a famous restaurant nationwide. Accordingly, although the restaurant has local significant, it may still be of very great interest to users nationwide. Thus, a search algorithm that takes into account search traffic and query log data may rank a document for the restaurant (e.g., a web page) very high.

By way of another example, a power company named after Thomas Edison may have very heavy local traffic in a large state. Thus, the search algorithm that takes into account search traffic and query log data will also rank a document for the power company very high due to the sheer volume or traffic to the webpage by its many customers. However, the power company webpage may be of very little interest to a user several states away. For example, a user may desire to learn about Thomas Edison, and not the power company that bears his name. However, due to the large volume of traffic to the power company web page, that web page may be ranked higher than a webpage about the man, the latter of which is more likely to be of interest to a user that inputs the query "Edison."

SUMMARY

In general, one innovative aspect of the subject matter described in this specification can be embodied in methods that include the actions of receiving data specifying a search query, and a location of a user device from which the search query was received; receiving data specifying a set of documents determined to be relevant to the search query, the data specifying, for each of the documents, a respective search score indicative of the relevance of the document to the query and a ranking of the documents according to a first order based on the search scores, and wherein a proper subset of the documents are local documents, wherein each of the local documents is a document that is specified as having local significance to a geographic location of a user device; determining that a first local document in the proper subset of the local documents is eligible for a demotion operation that adjusts its respective search score to demote the rank of the first local document in the first order, the determination based at least in part on a proximity measure based on the geographic location of the user device and a geographic location specified for the first local document, and in response to the determination: for each second local document in the proper subset of local documents, determining a proximity measure that is based on the geographic location of the user device and the geographic location specified for the second local document; and adjusting the search score of the first local document to demote its ranking the first order when at least one of the proximity measures indicates a respective second local document has a specified geographic location that is within a threshold distance of the geographic location of the user device. Other embodiments of this aspect include corresponding systems, apparatus, and computer programs, configured to perform the actions of the methods, encoded on computer storage devices.

These and other embodiments can each optionally include one or more of the following features. The method can further include, in response to determining that a first local document in the proper subset of the local documents is eligible for a demotion operation, determining that at least one document in the set of documents that is not a local document has a search score that meets a distant document demotion threshold and in response adjusting the search score of the first local document to demote its ranking in the first order so that the rank of the first local document relative to the rank of the at least one document is decreased.

Adjusting the search score of the first local document to demote its ranking in the first order so that the rank of the first local document relative to the rank of the at least one document is decreased can include adjusting the search score of the first local document to demote its ranking in the first order so that the rank of the at least one document is greater than the rank of the first local document.

The determination based at least in part on the proximity measure based on the geographic location of the user device and a geographic location specified for the first local document can include determining that the proximity measure indicates a distance between the geographic location of the user device and a geographic location specified for the first local document exceeds a maximum distance.

The determination is based at least in part on the proximity measure based on the geographic location of the user device and a geographic location specified for the first local document can include determining that the proximity measure indicates the geographic location of the user device and the geographic location specified for the first local document are not within a same region defined by a political boundary.

The search query can be a search query that does not include a location phrase that explicitly specifies a geographic location, and the data specifying a search query can include a local intent measure that is a measure of local intent for the search query.

The determining that a first local document in the proper subset of the local documents is eligible for a demotion operation can further include determining that the first local document is eligible for demotion based, in part, on local intent measure meeting a threshold value.

The data specifying a search query can include a local intent measure that is a measure of local intent for the search query, and adjusting the search score of the first local document to demote its ranking in the first order so that the rank of the first local document relative to the rank of the at least one document is decreased can include adjusting the search score of the first local document in inverse proportion to the local intent measure of the search query.

Determining that a first local document in the proper subset of the local documents is eligible for a demotion operation can further include determining that the first local document is eligible for demotion only if the first local document has a location independent search score component that does not meet distant document preservation threshold.

Particular embodiments of the subject matter described in this specification can be implemented so as to realize one or more of the following advantages. A data processing apparatus can provide more relevant search results in response to receipt of a single general search query with an implicit local intent by demoting local search results when the general search query is determined to be a locally significant search query for a particular user location, and the distance of the particular user location from the location associated with the local search result meets a distance requirement. However, local results for distant locations are not demoted if the local result has relatively high location independent search score, and thus otherwise information rich documents are not inadvertently demoted. Additionally, a local result for a distant location may not be demoted if there are no nearby local results, or if there are no other results having a relatively high location independent search score. Thus, a local document for a distant location will not be demoted if the remaining documents appear to be of less relevance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search results in a set of search result documents are processed to determine which, if any, of the search result documents are local search result documents. If a local search result document is identified, and it is further identified to be a "distant" search result document, then it is eligible for demotion. A local search result document is a "distant" search result document when the location associated with the local search result document is determined to not meet a proximity threshold. A proximity threshold may be met, for example, when the location for the local search result document and the location for the user device are within a same geographic region (e.g., a same state), or within a threshold distance (e.g., 100 miles).

A demotion of a local search result document occurs when the search query has a local intent, and there is one of: a) another local search result document having a location that is within a threshold distance of the location of the user device; or b) a search result document that is not a local search result document and having a sufficiently high search score. Finally, a distant search result document may be precluded from being demoted if a location-independent component of its search score meets a preservation threshold. In this latter case, the distant search result document may be of sufficient relevance to the query, independent of location, such that demotion would be detrimental to satisfying the user's informational need.

These features and additional features are described in more detail below.

Figure 1:
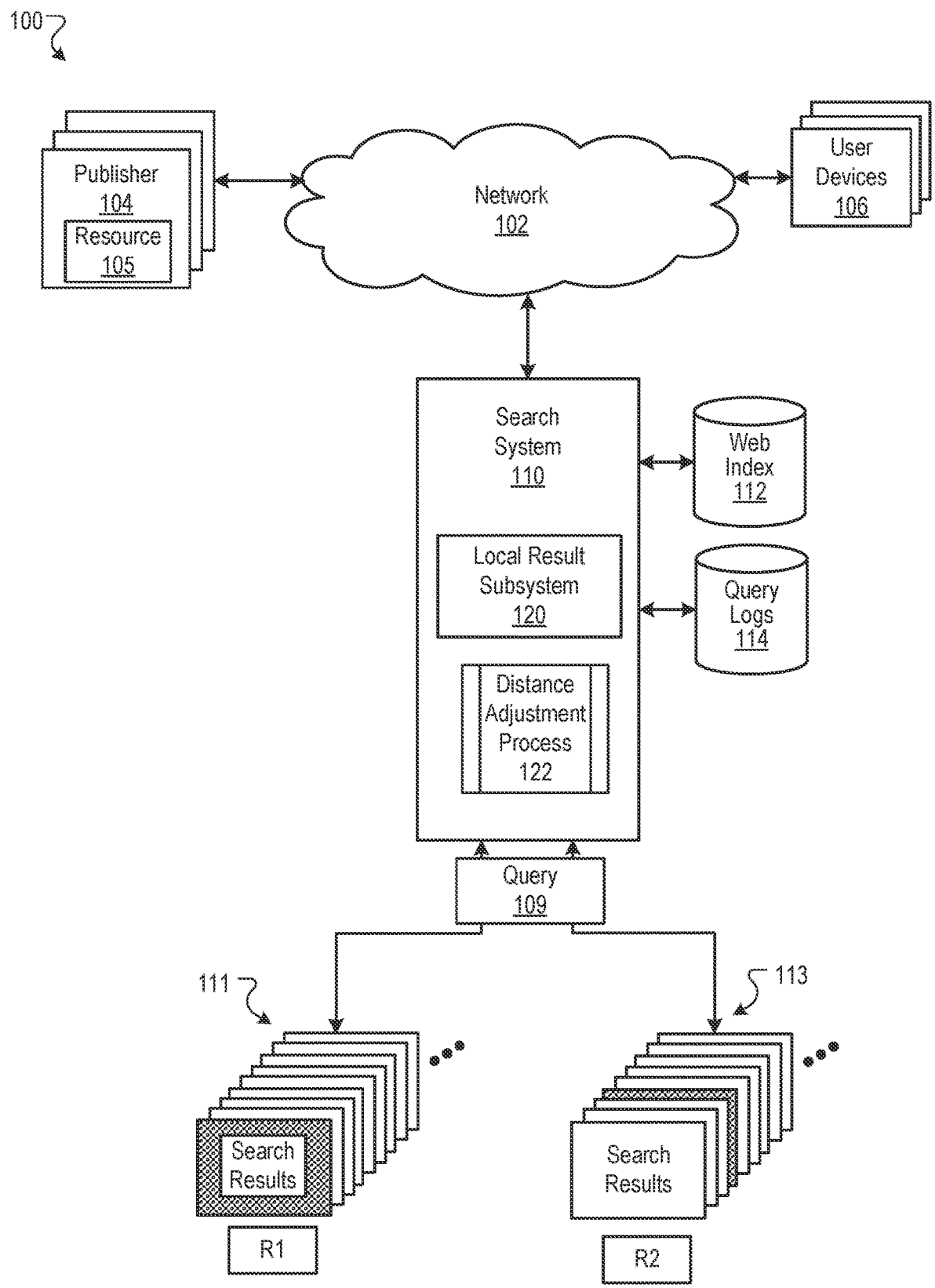
FIG. 1 is a block diagram of an example environment in which a search system provides local search results.

FIG. 1 is a block diagram of an example environment 100 in which a search system 110 provides local search results. The example environment 100 includes a network 102, such as the Internet, and connects publisher web sties 104, user devices 106, and the search system 110. Each website 104 is a collection of one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource 105 is any data that can be provided by the website 104 over the network 102 and that is associated with a resource address. Resources 105 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105. Data describing the resources 105 can be indexed and stored in a web index 112.

The user devices 106 submit search queries to the search system 110. In response, the search system 110 accesses the index 112 to identify resources 105 that are determined to be relevant to the search query. The search system 110 identifies the resources in the form of search results and returns the search results to the user devices 106 in search results page resource. A search result is data generated by the search system 110 that identifies a resource (generally referred to as a "document") or provides information that satisfies a particular search query. A search result for a document can include a web page title, a snippet of text extracted from the web page, and a resource locator for the resource, e.g., the URL of a web page. As used in this document, a "search result" is the listing provided in a search results web page, and a "search result document," or simply "document" is the resource linked to by the search result.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Other information can also be stored in the query logs, such as selection data for the queries and the web pages referenced by the search results and selected by users. The query logs 114 can thus be used to map queries submitted by user devices to resources that were identified in search results and the actions taken by users when presented with the search results in response to the queries.

Although many users may be satisfied with the search results that are generated and presented as described above, the search system 110 can use additional information and utilize additional subsystems to improve the quality of search results for particular users. One example of utilizing additional information is local search result processing. A local result subsystem 120 can identify local documents for a search query. A local document is a document that is specified as having local significance to a geographic location. A variety of appropriate systems may be used to determine local documents. For example, the local result subsystem 120 may determine a document is a local document if the document includes an address; or if search results for the document have a high rate of selection from user devices in a given location relative to user devices outside of the particular location; or if the local document has been specified by the publisher as being local to a particular location; etc. For queries that have a local intent, the local result subsystem 120 may indicate that certain documents that are determined to be responsive to the query are eligible for promotion. The feature of a document being a local document for certain queries may be stored in the web index 112.

A query may specify a local intent explicitly or implicitly. An explicit specification of local intent occurs when a query includes a location phrase and/or another geographic identifier. A location phrase is one or more terms that specify a geographic location (e.g., a zip code, an address, a city or a state). For example, the search query "Coffee shops Mountain View" includes the location phrase "Mountain View," such that the search query "Coffee shops Mountain View" is a local query. For such queries, search result documents that are local to the location specified by the location phrase may be determined to be more relevant than search result documents that are not local to the location. In particular, the location of the user device may be determined to be of little, if any, relevance, as the user has explicitly specified a location.

An implicit specification of locality, however, occurs when user responses to the query indicate a local interest. For example, for the query "coffee shops," observed user behavior may indicate that search results referencing documents having locations in close proximity to the location of the user device may be selected more often than search results referencing documents having locations that are more distant. Thus, such search queries may be determined to have an implicit local interest with respect to a user's current location. User selection behavior is one example way by which queries can be determined to have an implicit local intent; however, other processes can also be used. The feature of a query having an implicit local intent may be stored in the query logs 114.

When the search system 110 processes a query and identifies documents responsive to the query, the local result subsystem 120, in some implementations, determines if the query has an implicit local intent. If the query does not have an implicit local intent and is not an explicitly local query, e.g., such as the query "quadratic equation," then the ranking of search result document is not adjusted based on locality. However, if the query does have an implicit local intent, and is not an explicitly local query, e.g., such as the query "coffee shops," then the local result subsystem 120 performs a distance adjustment process 122. The local intent of the query can, in some implementations, be pre-determined, e.g., by another sub-system, and stored in the query logs. A variety of processes can be used to determine local intent of a query, such as the process that observes user behavior as described above.

Figure 2:
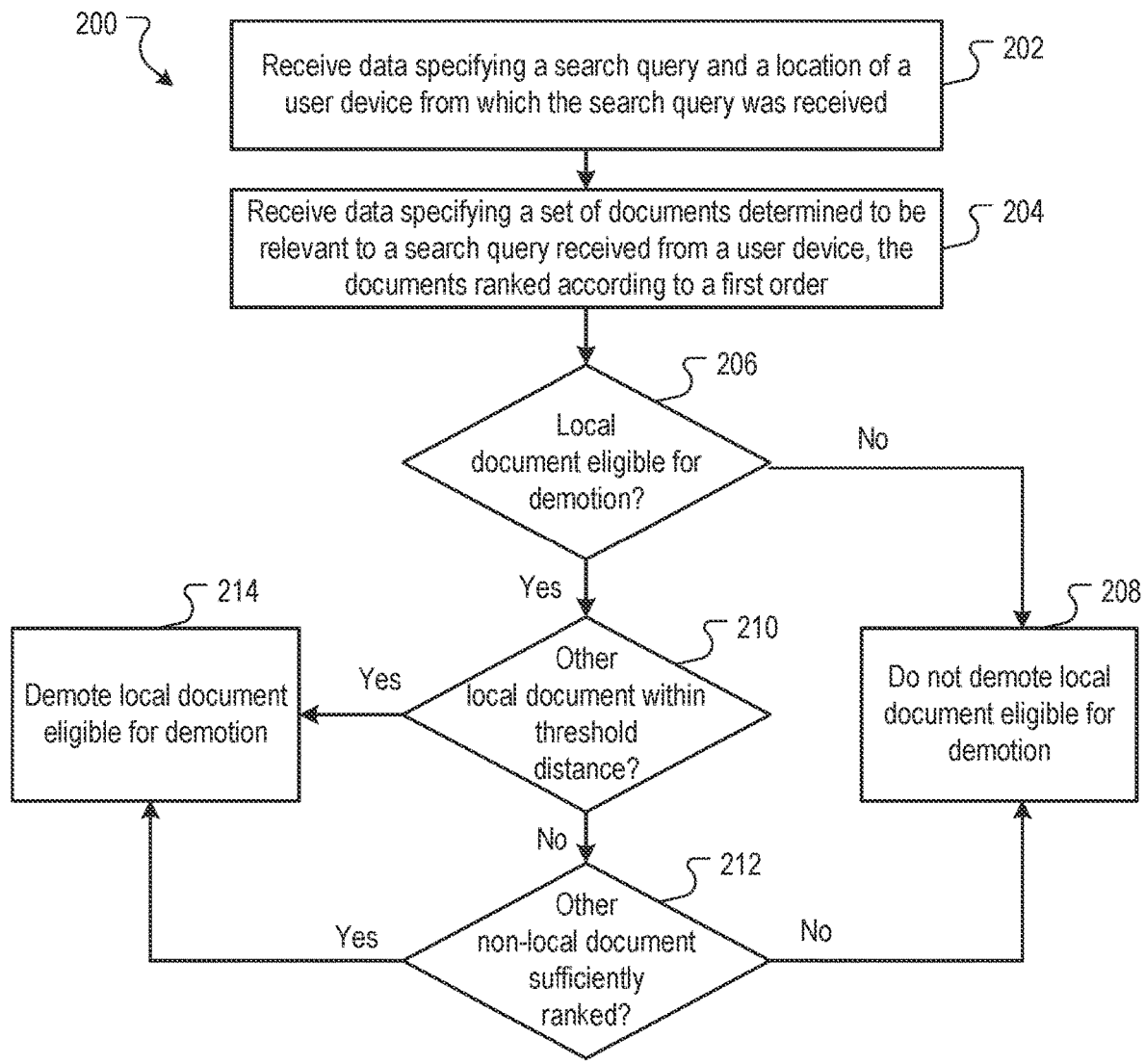
FIG. 2 is a flow chart of an example process for demoting a local search result having a distant location.

The distance adjustment process 122, in some implementations, adjusts the search scores of a local document depending on whether the local document is a "distant" document. When a local search result document is determined to be a distant document, it is eligible for demotion. Whether it is actually demoted depends, in some implementations, on the status of other documents in the set of documents responsive to the query, and on the search scores of those documents and the search score of the distant document. One example implementation of demoting distant search results based on these factors is described with reference to FIG. 2, which is a flow chart of an example process 200 for demoting a distant search result. The process 200 can be used in a data processing apparatus used to implement the local result subsystem 120.

The process 200 receives data specifying a search query and a location of a user device from which the search query was received (202). The location may be, for example, geographic coordinates (or approximations thereof) of the user device. Furthermore, in some implementations, the process 200 is operative only when the search query does not include a location phrase that explicitly specifies a geographic location, and the data specifying a search query includes a local intent measure that meets a threshold value.

For example, the process 200 may require that the local intent measure of the query indicate with at least an N % likelihood that that query has local intent.

The process 200 receives data specifying a set of documents determined to be relevant to a search query received from a user device, the documents ranked according to a first order (204). The data specifies, for each of the documents, a respective search score indicative of the relevance of the document to the query and a ranking of the documents according to a first order based on the search scores.

Figure 4:
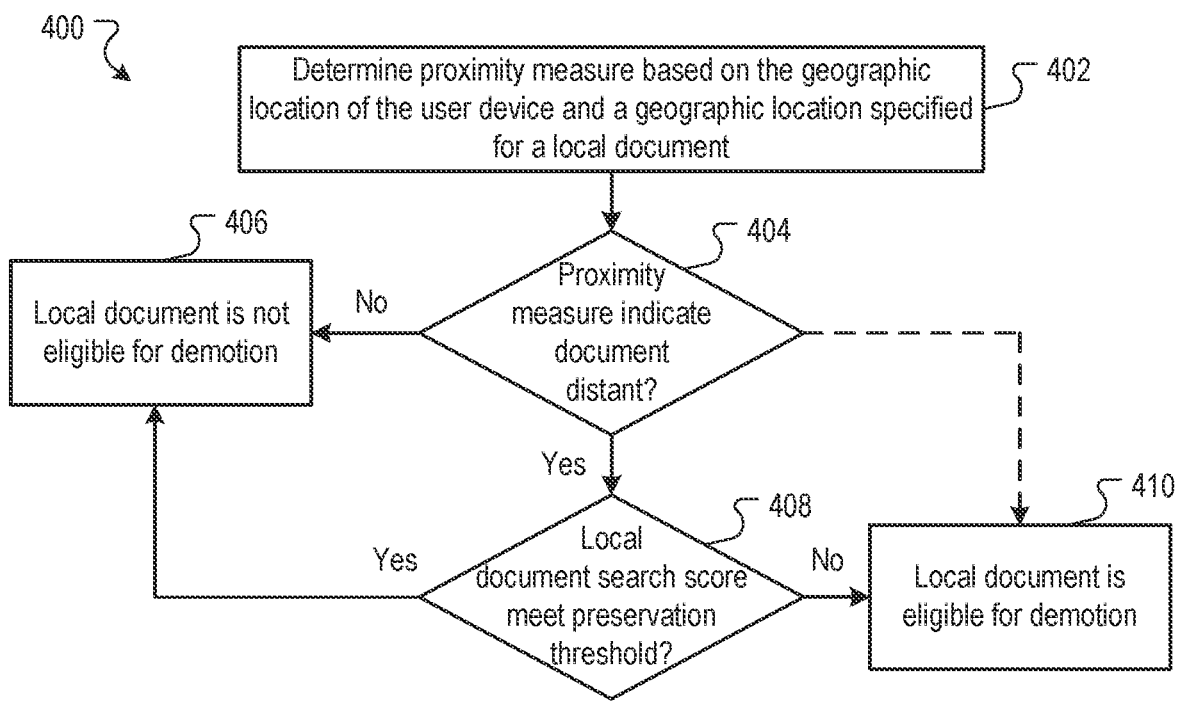
FIG. 4 is a flow chart of an example process for determining if a local search result is a local search result that is eligible for demotion.

Assume that a proper subset of the documents is local documents. The process 200 determines if a local document is eligible for demotion (206). An example process for determining whether a local document is eligible for demotion is described with reference to FIG. 4 below.

If the local document is not eligible for demotion, then the process 200 does not demote the local document (208). If, however, the local document is eligible for demotion, the local document is not automatically demoted; one or more subsequent conditions may be required to be met before the local document is demoted. For example, in some implementations, the local document is only demoted if there are other local documents having a location near the user device, or if other documents in the set of responsive documents, which are not local documents, have a sufficiently high search score.

The process 200 determines if there are other local documents having a location within a threshold distance of the location of the user device (210). For example, the process 200, for each other local document in the proper subset, determines a proximity measure that is based on the geographic location of the user device and the geographic location specified for the second local document. The proximity measure can indicate a distance, and if the indicated distance is less than a threshold distance, then the local document eligible for demotion will be demoted (214).

If, however, there are no other local documents having a location within a threshold distance of the location of the user device, then the process 200 determines if there is a non-local document that is sufficiently ranked in the set of documents (212). For example, the process 200 may determine whether at least one document in the set of documents that is not a local document and has a search score that meets a distant document demotion threshold. The distant document demotion threshold search score is a score that indicates a document is very relevant to the query. Because of the high relevance, the non-local document should not be displayed by the distant document.

If there is a non-local document that is sufficiently ranked in the set of documents, then the process 200 demotes the local document eligible for demotion. The process 200 adjusts the search score of the local document eligible for demotion to demote its ranking in the first order so that the rank of the demoted local document relative to the rank of the sufficiently ranked non-local document is decreased. In some implementations, the demotion can be such that the demoted local document is ranked at least one position below sufficiently ranked non-local document.

If there is not a non-local document that is sufficiently ranked, then the process 200 does not demote the local document eligible for demotion (208).

Figure 3:
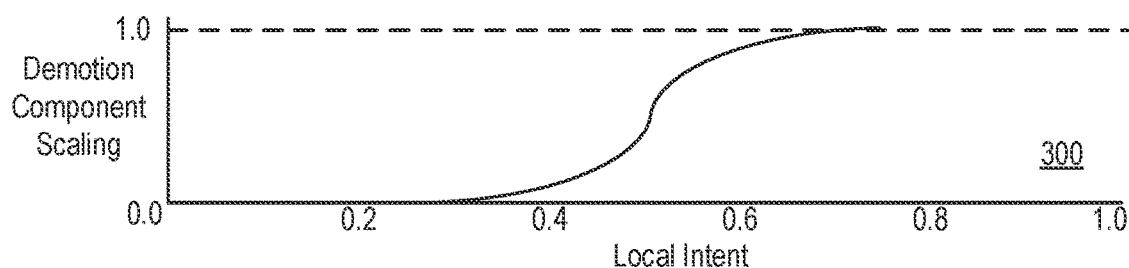
FIG. 3 is a graph illustrating a sigmoid for a demotion component based on a local intent measure of a query.

A demotion of a local document can be effected in a variety of appropriate ways. In some implementations, the demotion may be a fixed amount, such as a fixed percentage of a search score, or a fixed number of rank positions. Alternatively, the demotion may be dependent on one or more other factors. For example, a distant document may be demoted in proportion to the measure of local intent of a query. One such implementation of a demotion component based on local intent is shown in FIG. 3, which is a graph 300 illustrating a sigmoid for a demotion component based on a local intent measure of a query.

The graph 300 illustrates the scaling of a demotion component in the form of a sigmoid. The demotion component is used and the scaling is used to adjust the search score of a search document according to the following formula:

$$SS_{denoted}=SS*DC*DCS \qquad (1)$$

where
SS is the search score of the local document eligible for demotion;
DC is the demotion component, which is a value less than 1.0; and
DCS is the demotion scaling component of FIG. 3.

Formula (1) is one example formula, and other search score adjustment formulas can also be used. According to the graph of FIG. 3, for a very weak locality intent, there will be little or no demotion. However, as the local intent signal emerges, the demotion will increase rapidly. This results in an adjustment of the search score of the eligible local document in inverse proportion to the local intent measure of the search query.

Other functions beside a sigmoid can also be used to map the locality intent to a demotion component scaling factor. Furthermore, the function need not be symmetrical about the locality intent range; the function can, for example, be shifted upward or downward on the horizontal axis.

In some implementations, the local intent of the search query may also be considered when determining whether a local document is eligible for a demotion operation. For example, a threshold local intent may be required before a document may be demoted. For queries with a local intent less than the threshold local intent, no demotions will occur; conversely, for queries with a local intent greater than or equal to the threshold local intent, a demotion of a local document may occur.

As described above, only local documents that are eligible for a demotion operation may be demoted. Selection of local documents eligible for demotion is described with reference to FIG. 4, which is a flow chart of an example process 400 for determining if a local search result is a distant search result that is eligible for demotion. The process 400 can be used in a data processing apparatus used to implement the local result subsystem 120.

The process 400 determines a proximity measure based on the geographic location of the user device and a geographic location specified for a local document (402). The proximity measure can be, for example, either distance based or region based. For distanced based measures, the proximity measure is a measure of the distance between the geographic location of the user device and a geographic location specified for the first local document.

The process 400 determines if the proximity measure indicates the local document is distant (404). If the distance exceeds a maximum locality distance, then the local document may be eligible for demotion (410). Otherwise, the process 400 determines the local document is not eligible for a demotion (406).

The maximum locality distance may be the same for all local documents, or may be dependent on the local document type. For example, a maximum locality distance for local document belonging to the category of restaurants may be less than the maximum location distance for local documents belonging to the category of medical clinics.

In some implementations, the local document is eligible for demotion when the proximity measure indicates a distance that exceeds the maximum locality distance. In other implementations, however, the search score of the local document may preclude demotion. For example, if the proximity measure indicates a distant document, then the process 400 determines if the search score of the local document meets a preservation threshold (408).

The comparison of the search score to the preservation threshold may, in some implementations, be based on a location independent search score component of the local document. For example, the final ranking of the local document may be the result of a search score that has been modified based on the document's location. This modification is ignored, and the underlying relevance score that measures the relevance of the document to query, without consideration of locality, is used as the search score that is compared to the preservation threshold.

If the search score of the local document meets the preservation threshold, then the local document is not eligible for demotion (406). Otherwise, the process determines the local document is eligible for demotion (410).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a search query at a computing device;
identifying a current location of the computing device;
transmitting the search query and an indication of the current location of the computing device to a search system;
receiving, by the computing device and from the search system as a response to the search query, data representing a set of search results,
wherein the set of search results includes a local search result having local significance to the search query and a non-local search result that is not deemed to have local significance to the search query, and
wherein the search system is configured to cause the local search result to be presented in the set of search results at the computing device in a less prominent position than the non-local search result based on determinations that (i) a proximity between the current location of the computing device and a location associated with the local search result meets a first demotion criterion and (ii) an attribute of the non-local search result meets a second demotion criterion; and
presenting, by the computing device, search results from the set of search results including presenting the local search result in the less prominent position than the non-local search result.

2. The computer-implemented method of claim 1, wherein causing the local search result to be presented in the set of search results at the computing device in the less prominent position than the non-local search result comprises determining that the proximity between the current location of the computing device and the location associated with the first search result does not meet a proximity threshold.

3. The computer-implemented method of claim 2, wherein the proximity threshold defines a criterion for co-location in a same geographic region, and the proximity between the current location of the computing device and the location associated with the local search result does not meet the proximity threshold if the current location of the computing device is in a different geographic region than the location associated with the local search result.

4. The computer-implemented method of claim 3, wherein the criterion defined by the proximity threshold is for the current location of the computing device and the location associated with the local search result to be co-located in a same political region.

5. The computer-implemented method of claim 2, wherein the proximity threshold defines a maximum locality distance, and the proximity between the current location of the computing device and the location associated with the local search result does not meet the proximity threshold if the current location of the computing device is farther from the location associated with the local search result than the maximum locality distance.

6. The computer-implemented method of claim 1, wherein the search system is configured to determine that the local search result is ineligible for demotion in the ranking of the set of search results if, regardless of whether a proximity between the current location of the computing device and the location associated with the local search result meets a proximity threshold, a location-independent score for the local search result meets a preservation criterion.

7. One or more non-transitory computer-readable media having instructions stored thereon that, when executed by one or more processors of a computing device, cause the one or more processors to perform operations comprising:
 receiving a search query at the computing device;
 identifying a current location of the computing device;
 transmitting the search query and an indication of the current location of the computing device to a search system;
 receiving, by the computing device and from the search system as a response to the search query, data representing a set of search results,
  wherein the set of search results includes a local search result having local significance to the search query and a non-local search result that is not deemed to have local significance to the search query, and
  wherein the search system is configured to cause the local search result to be presented in the set of search results at the computing device in a less prominent position than the non-local search result based on determinations that (i) a proximity between the current location of the computing device and a location associated with the local search result meets a first demotion criterion and (ii) an attribute of the non-local search result meets a second demotion criterion; and
 presenting, by the computing device, search results from the set of search results including presenting the local search result in the less prominent position than the non-local search result.

8. The one or more non-transitory computer-readable media of claim 7, wherein causing the local search result to be presented in the set of search results at the computing device in the less prominent position than the non-local search result comprises determining that the proximity between the current location of the computing device and the location associated with the first search result does not meet a proximity threshold.

9. The one or more non-transitory computer-readable media of claim 8, wherein the proximity threshold defines a criterion for co-location in a same geographic region, and the proximity between the current location of the computing device and the location associated with the local search result does not meet the proximity threshold if the current location of the computing device is in a different geographic region than the location associated with the local search result.

10. The one or more non-transitory computer-readable media of claim 9, wherein the criterion defined by the proximity threshold is for the current location of the computing device and the location associated with the local search result to be co-located in a same political region.

11. The one or more non-transitory computer-readable media of claim 8, wherein the proximity threshold defines a maximum locality distance, and the proximity between the current location of the computing device and the location associated with the local search result does not meet the proximity threshold if the current location of the computing device is farther from the location associated with the local search result than the maximum locality distance.

12. The one or more non-transitory computer-readable media of claim 7, wherein the search system is configured to determine that the local search result is ineligible for demotion in the ranking of the set of search results if, regardless of whether a proximity between the current location of the computing device and the location associated with the local search result meets a proximity threshold, a location-independent score for the local search result meets a preservation criterion.

13. A computing device, comprising:
 one or more processing devices; and
 one or more computer-readable media having instructions stored thereon that, when executed by the one or more processing devices, cause the one or more processing devices to perform operations comprising:
  receiving a search query at the computing device;
  identifying a current location of the computing device;
  transmitting the search query and an indication of the current location of the computing device to a search system;
  receiving, by the computing device and from the search system as a response to the search query, data representing a set of search results,
   wherein the set of search results includes a local search result having local significance to the search query and a non-local search result that is not deemed to have local significance to the search query, and
   wherein the search system is configured to cause the local search result to be presented in the set of search results at the computing device in a less prominent position than the non-local search result based on determinations that (i) a proximity between the current location of the computing device and a location associated with the local search result meets a first demotion criterion and (ii) an attribute of the non-local search result meets a second demotion criterion; and
  presenting, by the computing device, search results from the set of search results including presenting the local search result in the less prominent position than the non-local search result.

14. The computing device of claim 13, wherein causing the local search result to be presented in the set of search results at the computing device in the less prominent position than the non-local search result comprises determining that the proximity between the current location of the computing device and the location associated with the first search result does not meet a proximity threshold.

15. The computing device of claim 14, wherein the proximity threshold defines a criterion for co-location in a same geographic region, and the proximity between the current location of the computing device and the location associated with the local search result does not meet the proximity threshold if the current location of the computing device is in a different geographic region than the location associated with the local search result.

16. The computing device of claim 15, wherein the criterion defined by the proximity threshold is for the current location of the computing device and the location associated with the local search result to be co-located in a same political region.

17. The computing device of claim 14, wherein the proximity threshold defines a maximum locality distance, and the proximity between the current location of the computing device and the location associated with the local search result does not meet the proximity threshold if the current location of the computing device is farther from the location associated with the local search result than the maximum locality distance.

18. The computing device of claim 13, wherein the search system is configured to determine that the local search result is ineligible for demotion in the ranking of the set of search results if, regardless of whether a proximity between the current location of the computing device and the location associated with the local search result meets a proximity threshold, a location-independent score for the local search result meets a preservation criterion.

* * * * *